(12) United States Patent
Hansen

(10) Patent No.: US 12,714,024 B2
(45) Date of Patent: Aug. 25, 2026

(54) FAN BLADE FOR A SUGARCANE HARVESTER EXTRACTOR

(71) Applicant: Deere & Company, Moline, IL (US)

(72) Inventor: Matthew J. Hansen, Thibodaux, LA (US)

(73) Assignee: Deere & Company, Moline, IL (US)

( * ) Notice: Subject to any disclaimer, the term of this patent is extended or adjusted under 35 U.S.C. 154(b) by 409 days.

(21) Appl. No.: 18/488,200

(22) Filed: Oct. 17, 2023

(65) Prior Publication Data

US 2025/0120341 A1 Apr. 17, 2025

(51) Int. Cl.
*A01D 43/08* (2006.01)
*A01D 45/10* (2006.01)

(52) U.S. Cl.
CPC .......... *A01D 43/08* (2013.01); *A01D 43/086* (2013.01); *A01D 45/10* (2013.01)

(58) Field of Classification Search
CPC .... A01D 45/10; A01D 41/1243; A01D 87/10; A01D 34/005; A01D 34/71; A01D 34/73; A01D 34/695; A01D 43/08; A01D 43/086; A01D 43/087; F04D 29/388; A01F 12/40; B02C 13/08; B02C 18/06–24; B02C 2201/066; B07B 4/00; B07B 4/02; B26D 1/00; B26D 1/0006; B26D 1/0033; B26D 1/25; B26D 1/26; B26D 1/28; B26D 1/29
USPC ......................... 83/98, 100; 241/58; 56/16.5
See application file for complete search history.

(56) References Cited

U.S. PATENT DOCUMENTS 2,621,457 A * 12/1952 Rosenberg ............ A01D 34/73 56/13.6
4,856,194 A * 8/1989 Lee ..................... A01D 34/736 30/276
4,893,457 A * 1/1990 Castain ................. A01D 34/73 56/295
6,470,662 B1 * 10/2002 Burke ................... A01D 34/73 56/255
9,468,144 B2 * 10/2016 Kurioka .............. A01D 34/826
9,976,567 B2 * 5/2018 Junior .................. F04D 29/384
11,419,269 B2 * 8/2022 Oubre, Jr. ............. A01D 43/08
11,917,940 B1 * 3/2024 Wright .................. A01D 34/81
2023/0120208 A1 4/2023 Hansen et al.
2023/0121162 A1 4/2023 Hansen et al.

FOREIGN PATENT DOCUMENTS

DE 102006058958 A1 * 6/2008

* cited by examiner

*Primary Examiner* — Alicia Torres

(57) ABSTRACT

An extractor for a sugarcane harvester includes a fan assembly positioned within an interior passage of a housing. The fan assembly includes a fan blade mounted for rotation about a central axis for inducing a flow of air through the interior passage. The fan blade includes a leading edge including a bevel defining a cutting edge configured for cutting leaf material. The fan blade extends radially outward from the central axis to a radially outer edge. The leading edge includes a center portion and a radially outer corner portion. The radially outer corner portion of the leading edge extends between the center portion of the leading edge and the radially outer edge. The radially outer corner portion is curved toward the trailing edge.

18 Claims, 6 Drawing Sheets

88
52
82
80
86
94
96

FAN BLADE FOR A SUGARCANE HARVESTER EXTRACTOR

TECHNICAL FIELD

The disclosure generally relates to a sugarcane harvester, and more particularly to a fan blade of an extractor of the sugarcane harvester.

BACKGROUND

A sugarcane harvester may include a chopper that cuts stalks of sugarcane into billets. The billets, combined with any crop residue, e.g., leaf material, is moved from the chopper toward an elevator. The elevator lifts the billets to a higher elevation for discharge into a wagon or trailer. The sugarcane harvester may include an extractor for removing the crop residue, including leaf material, from the billets. The sugarcane harvester may include a primary extractor positioned between the chopper and the elevator, and may further include a secondary extractor positioned adjacent an upper discharge end of the elevator.

The extractor(s) include a housing forming an internal passage, and a fan assembly disposed within the internal passage. The fan assembly includes a plurality of fan blades rotatable supported for rotation about a central axis. The fan blades are configured to rotate and induce a flow of air through the internal passage, which draws the crop residue and leaf material away from the billets to clean the billets. The fan blades may include a cutting edge to cut leaf material passing through the extractor. The cutting edge of the fan blades disposed in a region proximate a radially outer end of the cutting edge and the housing of the extractor exhibit a high amount of wear.

SUMMARY

An extractor for a sugarcane harvester is provided. The extractor includes a housing defining an interior passage extending along a central axis. A fan assembly is positioned within the interior passage of the housing. The fan assembly includes a fan blade mounted for rotation about the central axis. The fan blade is configured for inducing a flow of air through the interior passage for extracting leaf material from a flow of sugarcane billets. The fan blade includes a leading edge and a trailing edge relative to a rotational direction of the fan assembly. The leading edge includes a bevel defining a cutting edge configured for cutting the leaf material. The fan blade extends radially outward from the central axis to a radially outer edge of the fan blade that extends between the leading edge and the trailing edge. The leading edge includes a center portion and a radially outer corner portion. The radially outer corner portion of the leading edge extends between the center portion of the leading edge and the radially outer edge. The radially outer corner portion is curved toward the trailing edge.

In one aspect of the disclosure, the fan blade includes a body. The body includes the leading edge and the trailing edge. The body extends radially outward between a radially inner edge of the body and the radially outer edge of the body, and extends between the leading edge and the trailing edge along both the radially inner edge and the radially outer edge.

In one aspect of the disclosure, the bevel defining the cutting edge extends across both the center portion of the leading edge of the fan blade and the radially outer corner portion of the leading edge of the fan blade. Accordingly, the entire leading edge of the fan blade, including both the center portion and the radially outer corner portion, define the cutting edge and are configured for cutting the leaf material drawn through the extractor.

In one aspect of the disclosure, the radially outer corner portion includes a radially inner end disposed adjacent to the center portion. In one implementation, the radially inner end of the radially outer corner portion may be arranged tangential to the center portion. In other implementations, the radially inner end of the radially outer corner portion may be arranged such that the radially outer corner portion forms an acute angle with the center portion.

In one aspect of the disclosure, the radially outer corner portion includes a radially outer end. The radially outer end of the radially outer corner portion may be arranged such that the radially outer corner portion forms an obtuse angle with the radially outer edge of the fan blade.

In one aspect of the disclosure, the radially outer corner portion defines a corner radius. In one implementation, the corner radius may be greater than 150 mm. Additionally, in one implementation, the corner radius may be less than 500 mm.

In one implementation of the disclosure, the center portion of the leading edge of the fan blade may define a center radius. The corner radius of the radially outer corner portion may be less than the center radius of the center portion. In other implementations, the center portion of the leading edge of the fan blade may define a straight linear edge.

In one aspect of the disclosure, the radially outer corner portion of the leading edge may include corner rate of curvature, and the center portion of the leading edge may include a center rate of curvature. The corner rate of curvature may be greater than the center rate of curvature.

In one aspect of the disclosure, the body of the fan blade is angled relative to a plane of rotation of the fan blade for inducing the flow of air through the interior passage of the housing. The plane of rotation of the fan blade may be substantially orthogonal to the central axis.

In one aspect of the disclosure, a sugarcane harvester is provided. The sugarcane harvester may include the extractor described above. The sugarcane harvester may further include a basecutter having a cutting disk configured for severing stalks of sugarcane, and a chopper having a drum configured for cutting the stalks of sugarcane into billets.

The fan blade described herein incorporates the radially outer corner portion into the leading edge. Both the center portion and the radially outer corner portion define the cutting edge for cutting the leaf material drawn through the extractor from the flow of billets. The radially outer corner portion is curved toward the trailing edge, which improves the cutting efficiency of the cutting edge near the radially outer edge of the fan blade compared to a fan blade that does not include the curved radially outer corner portion. This improved cutting efficiency increase the wear resistance of the cutting edge of the fan blade, thereby increasing time intervals between fan blade replacement, which in turn reduces life-cycle operating costs of the sugarcane harvester.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
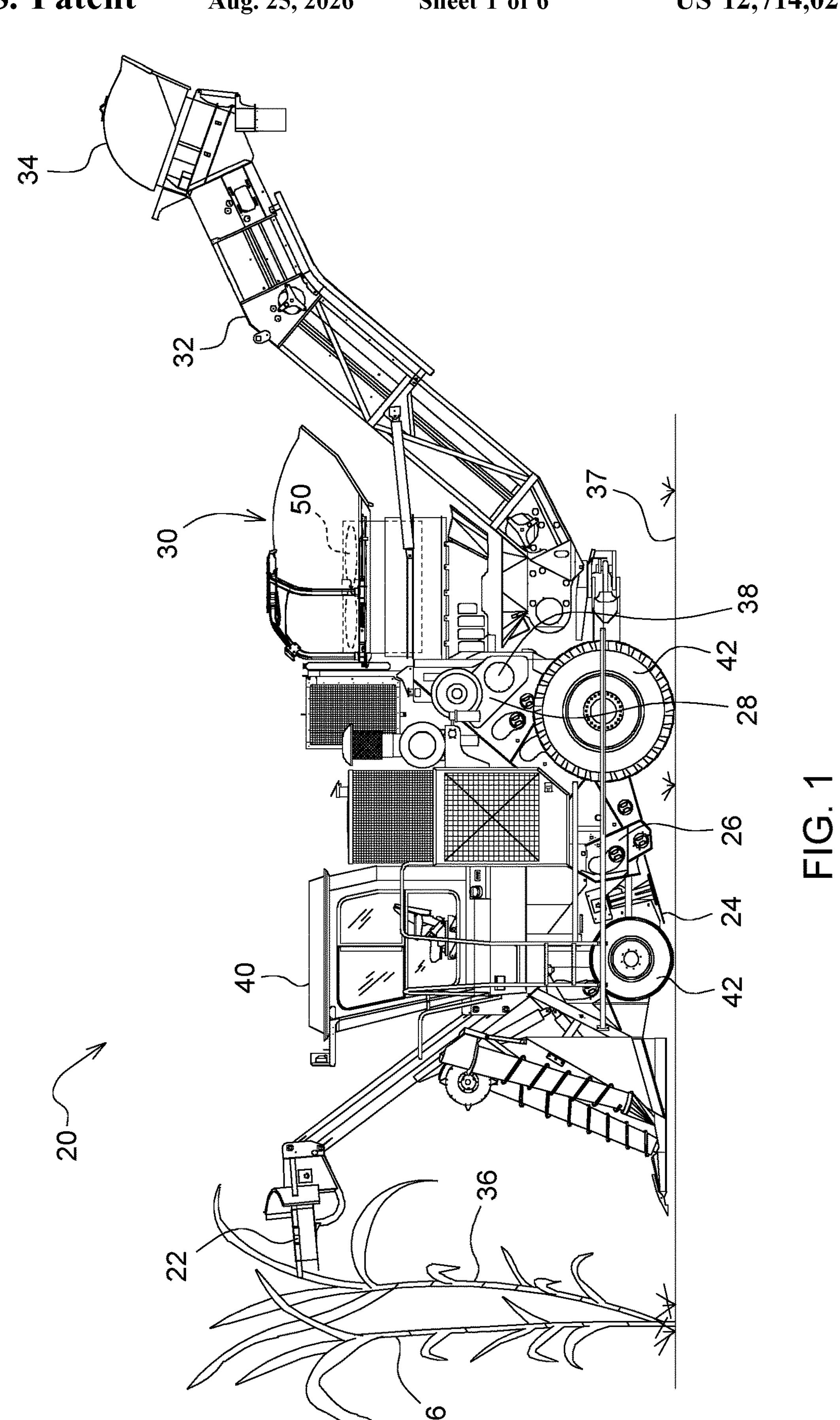
FIG. 1 is a schematic side view of a sugarcane harvester.

Referring to the Figures, wherein like numerals indicate like parts throughout the several views, a sugarcane harvester is generally shown at 20 in FIG. 1. Referring to FIG. 1, the sugarcane harvester 20 is configured to harvest sugarcane while traversing through a field. The example implementation of the sugarcane harvester 20 shown in the Figures and described herein includes, but is not limited to, a topper 22, a basecutter 24, a feed section 26, a chopper 28, a primary extractor 30, an elevator 32, and a secondary extractor 34. It should be appreciated that the sugarcane harvester 20 may differ from the example implementation shown in the Figures and described herein.

The topper 22 cuts leaf material off the top of the sugarcane plants 36 before the plants 36 are severed by the basecutter 24. However, the topper 22 may not remove all the leaf material from the plants 36 before ingestion into the sugarcane harvester 20.

The basecutter 24 may include a left cutting disk and a right cutting disk. The left and right cutting disks of the basecutter 24 cooperate with one another to sever the stalks of sugarcane plants 36 at a location near a ground surface 37. The basecutter 24 feeds a mat of the severed sugarcane stalks rearward to the feed section 26. The feed section 26 receives the mat of severed sugarcane stalks from the basecutter 24 and moves the mat rearwardly to the chopper 28. The chopper 28 receives the mat of sugarcane stalks from the feed section 26. The chopper 28 may include a drum 38 configured for cutting the stalks of sugarcane into billets.

The primary extractor 30 is positioned between the chopper 28 and the elevator 32. As noted above, some leaf material may remain with the sugarcane stalks as the stalks are processed into billets. The primary extractor 30 extracts the leaf material discharged from the chopper 28 with the billets and removes the leaf material from the sugarcane harvester 20. The elevator 32 is positioned at the rear of the sugarcane harvester 20 to receive the billets and convey them to an elevated position where the billets are discharged from the sugarcane harvester 20 into a wagon to be hauled away. The secondary extractor 34 may be mounted to the upper discharge end of the elevator 32 to further extract leaf material from the billets that may not have been removed by the primary extractor 30.

The sugarcane harvester 20 includes an operator's station 40 and traction elements 42. A human operator can operate the sugarcane harvester 20 from the operator's station 40. The traction elements 42 are positioned on the left and right sides of the sugarcane harvester 20 for engaging the ground surface 37 and propelling the sugarcane harvester 20 along the ground surface 37. Illustratively, there may be two traction elements 42, each in the form of a ground-engaging wheel, located on each side of the sugarcane harvester 20. In other embodiments, there may be one traction element, in the form of a track unit, located on each side of the sugarcane harvester 20.

Figure 2:
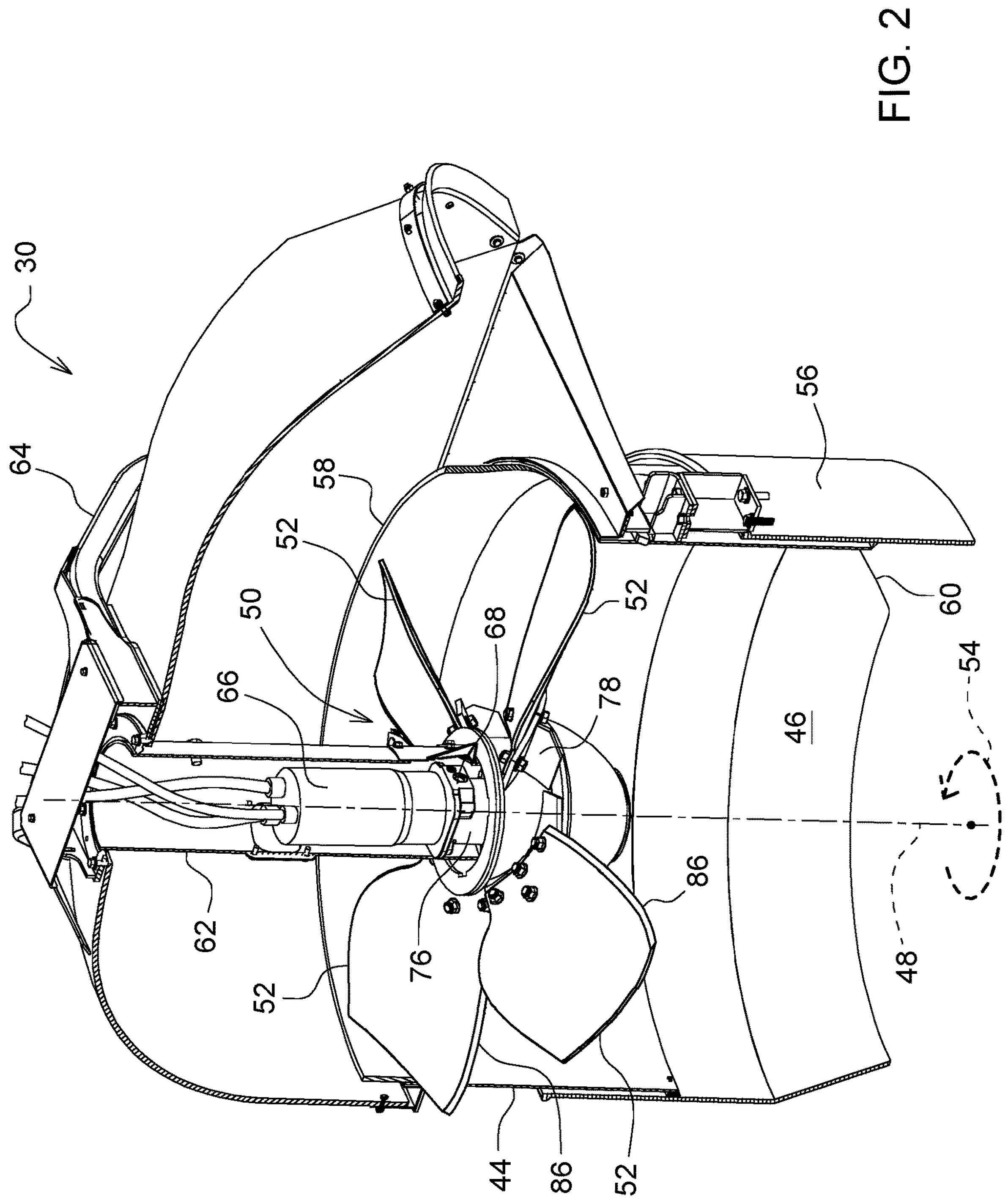
FIG. 2 is a schematic cut-away perspective view of an extractor of the sugarcane harvester.
Figure 3:
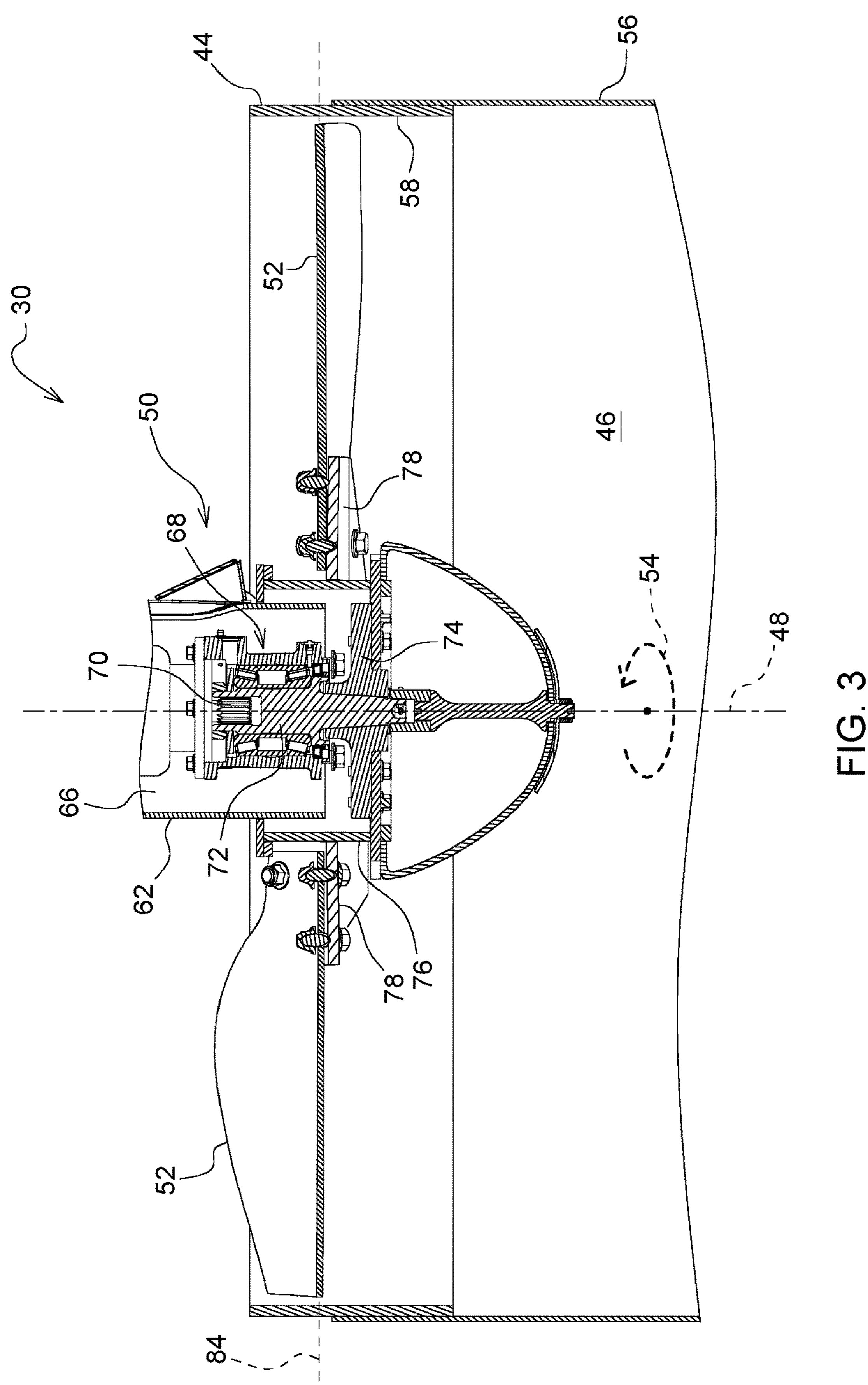
FIG. 3 is a schematic cross-sectional side view of the extractor.
Figure 4:
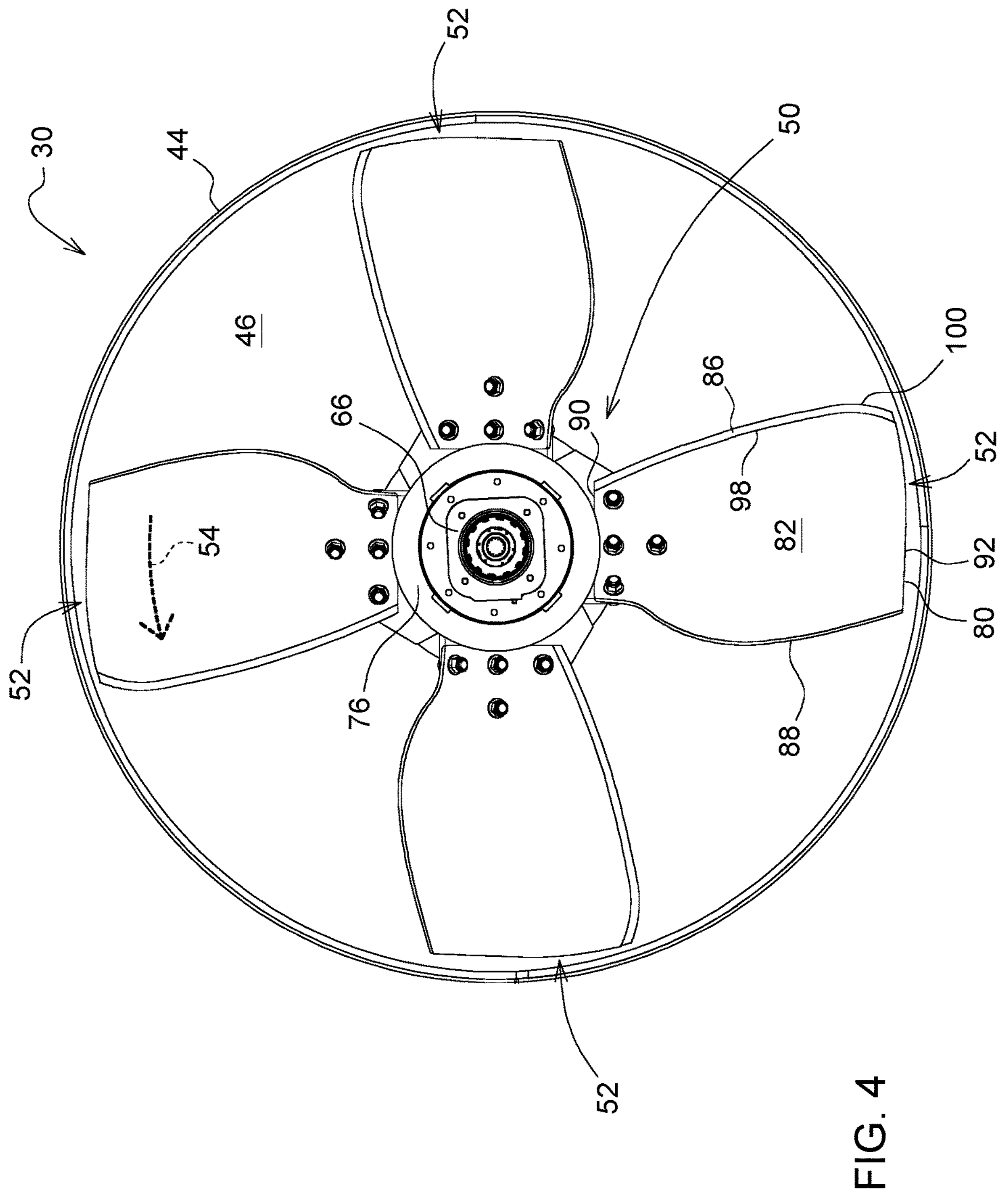
FIG. 4 is a schematic plan view from above of the extractor.

Referring to FIGS. 2-4, the extractor includes a housing 44 defining an interior passage 46 extending along a central axis 48. The extractor further includes a fan assembly 50 disposed and/or positioned within the interior passage 46 of the housing 44. The fan assembly 50 includes one or more fan blades 52 (e.g., four fan blades 52) mounted for rotation about the central axis 48 in a direction of rotation 54 of the fan blades 52. Rotation of the fan blades 52 about the central axis 48 induces a flow of air through the interior passage 46 of the housing 44 of the fan assembly 50. The flow of air through the fan assembly 50 extracts the leaf material from the flow of billets produced by the chopper 28. The billets are airborne when discharged from the chopper 28, facilitating separation of the leaf material from the billets by the flow of air induced by the fan assembly 50. Similarly, the billets are airborne when discharged from the elevator 32 at the secondary extractor 34 facilitating separation of leaf material from the billets by a flow of air induced by a fan assembly 50 of the secondary extractor 34.

The housing 44 may include a lower portion 56 and an upper portion 58 supported on the lower portion 56. The lower portion 56 is fixed to a frame of the sugarcane harvester 20 and includes an inlet 60 into the housing 44 through which billets and leaf material enter the extractor from the chopper 28. The fan assembly 50 is supported by the housing 44 for rotation relative thereto about the central axis 48. The upper portion 58 includes a support column 62. The support column 62 is positioned within the housing 44 and is coupled to and depends from a spider 64 of a frame of the upper portion 58.

The extractor includes a motor 66 and a bearing assembly 68. The motor 66 and the bearing assembly 68 are positioned within and supported by the support column 62. The motor 66 includes an output 70 that rotates about the central axis 48. The output 70 includes a motor shaft 72 and a coupling 74 splined to the motor shaft 72 and extending through the bearing assembly 68 downwardly out of the support column 62. The extractor includes a hub 76 coupled to the motor 66. The hub 76 is rotatably driven about the central axis 48. The motor 66 is drivingly coupled to the hub 76 via the output 70 to rotate the hub 76 and the fan assembly 50 coupled thereto about the central axis 48. The hub 76 receives and is coupled to the output 70 for rotation of the hub 76 therewith about the central axis 48.

The fan blades 52 are coupled to the hub 76 for rotation together with the hub 76 about the central axis 48. Such rotation of the fan blades 52 induces the flow of air through the interior passage 46 of the housing 44. The fan blades 52 are coupled to the hub 76 thereabout via a set of attachment points 78 on the hub 76. The fan blades 52 may be coupled respectively to the attachment points 78 with fasteners (e.g., bolts).

Figure 5:
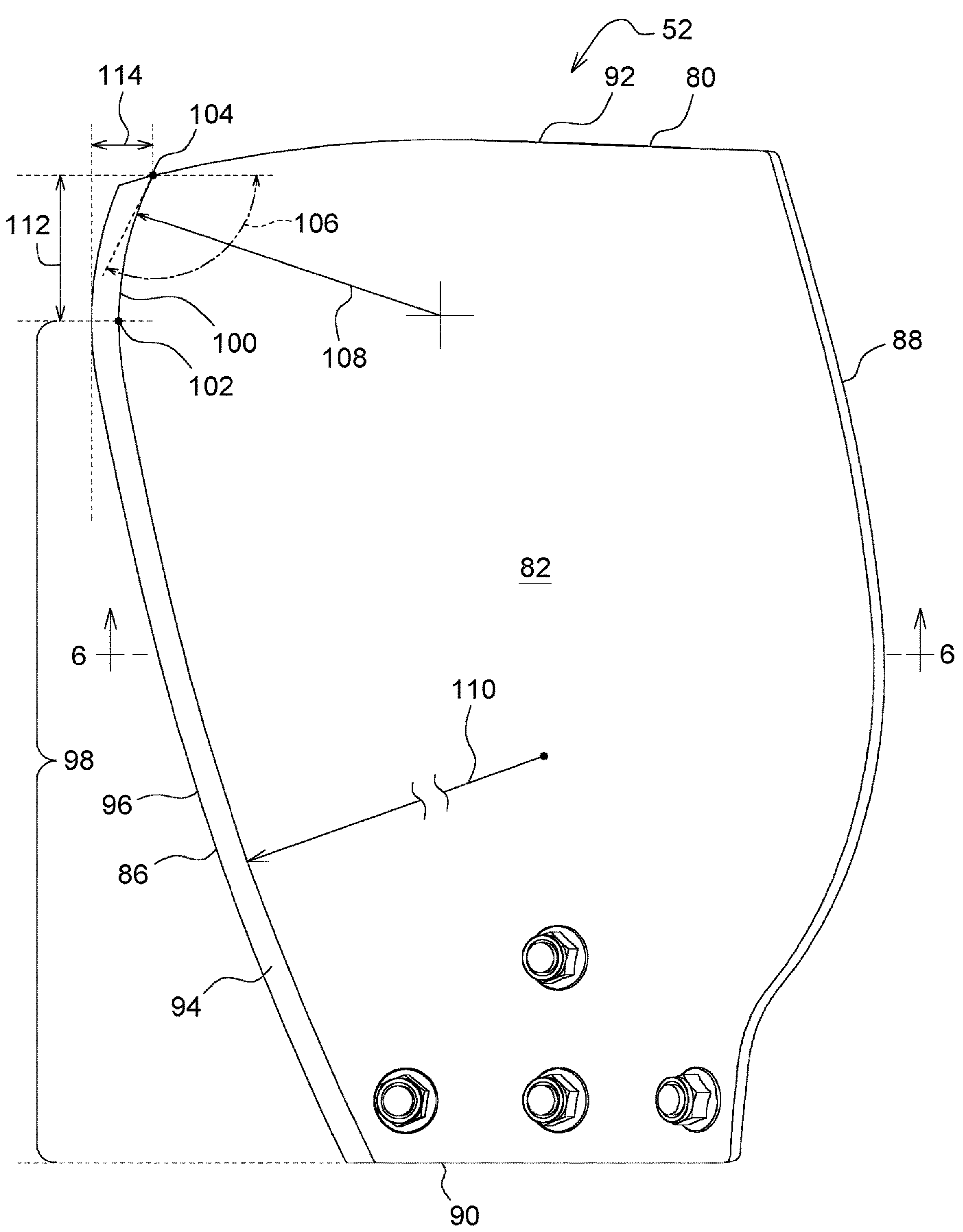
FIG. 5 is a schematic plan view of a fan blade of the extractor.
Figure 6:
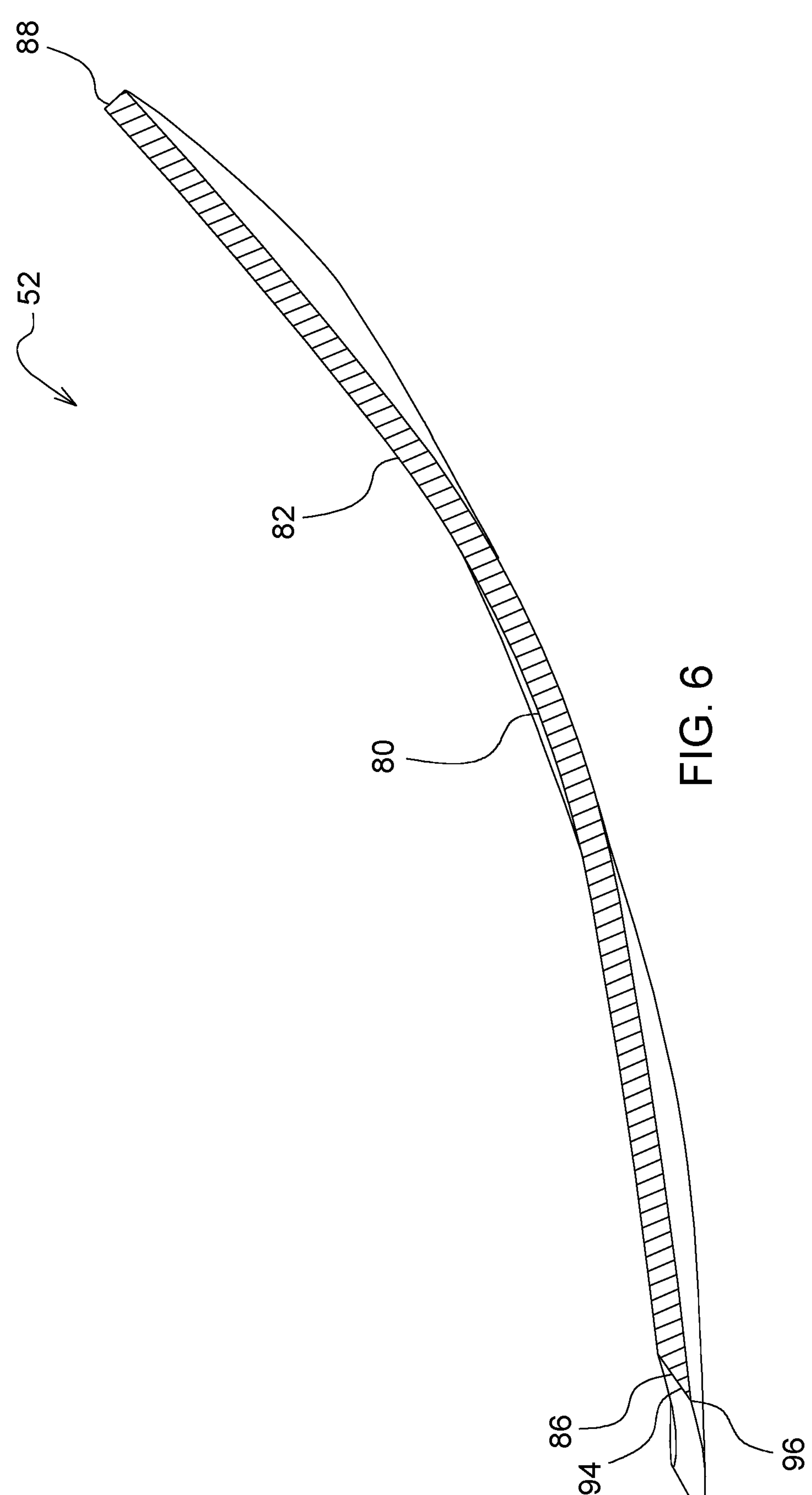
FIG. 6 is a schematic cross-sectional view of the fan blade.

Referring to FIGS. 5 and 6, one of the fan blades 52 is shown in detail. It should be appreciated that the other fan blades 52 are identical to the example shown in FIGS. 5 and 6. As shown in FIG. 5, the fan blade 52 includes a body 80. The body 80 is configured for rotation about the central axis 48. The body 80 is angled and/or presents an angle surface 82 relative to a plane of rotation 84 of the fan blade 52. The plane of rotation 84 of the fan blade 52 is a plane arranged substantially orthogonal to the central axis 48. The body 80 is angled relative to the plane of rotation 84 for inducing the flow of air parallel to the central axis 48 and through the interior passage 46 of the housing 44 during rotation about the central axis 48 in the direction of rotation 54.

The body 80 of the fan blade 52 defines a leading edge 86 and a trailing edge 88 relative to the direction of rotation 54 of the fan blade 52 and the fan assembly 50 during operation. The body 80 of the fan blade 52 extends between the leading edge 86 and the trailing edge 88 in a circumferential direction relative to the central axis 48. The body 80 extends radially outward between a radially inner edge 90 of the body 80 and a radially outer edge 92 of the body 80. The body 80 extends between the leading edge 86 and the trailing edge 88 along both the radially inner edge 90 and the radially outer edge 92.

As best shown in FIG. 6, the leading edge 86 of the fan blade 52 includes a bevel 94 forming and/or defining a cutting edge 96 configured for cutting the leaf material passing through the extractor. Accordingly, the fan blade 52 is configured to both move air and cut leaf material. Referring to FIG. 5, the leading edge 86 of the fan blade 52 includes a center portion 98 and a radially outer corner portion 100. The radially outer corner portion 100 of the leading edge 86 extends between the center portion 98 of the leading edge 86 and the radially outer edge 92 of the body 80 of the fan blade 52. The cutting edge 96 extends the full length of the leading edge 86 to promote the cutting effectiveness of the fan blade 52. As such, the bevel 94 defining the cutting edge 96 extends across both the center portion 98 of the leading edge 86 and the radially outer corner portion 100 of the leading edge 86.

The radially outer corner portion 100 is curved toward the trailing edge 88, thereby increasing the cutting effectiveness of the fan blade 52 in the region between the radially outer corner portion 100 and the housing 44 of the extractor. This increase in cutting effectiveness reduces wear in the fan blade 52 in this region, thereby extending the useful life of the fan blade 52.

The radially outer corner portion 100 of the leading edge 86 includes a radially inner end 102 and a radially outer end 104. The radially inner end 102 of the radially outer corner portion 100 is positioned adjacent to the center portion 98. In the example implementation of the fan blade 52 shown in FIG. 5, the radially inner end 102 is shown arranged tangential to the center portion 98. However, in other implementations, the radially inner end 102 may be arranged such that the radially outer corner portion 100 and the center portion 98 form an acute angle therebetween at the radially inner end 102. The radially outer end 104 of the radially outer corner portion 100 may be arranged and/or positioned such that the radially outer corner portion 100 forms an obtuse angle 106 with the radially outer edge 92 at the radially outer end 104 of the radially outer corner portion 100. The obtuse angle 106 may include, for example, a value between ninety degrees (90°) and one hundred thirty five degrees (135°). In one particular example, the obtuse angle 106 is approximately equal to one hundred five degrees (105°).

The radially outer corner portion 100 may define a corner radius 108. The corner radius 108 may include a value between a minimum radius and a maximum radius. In one implementation, the minimum radius of the corner radius 108 may be approximately equal to 150 mm. As such, the corner radius 108 may be greater than 150 mm. In one implementation, the maximum radius of the corner radius 108 may be approximately equal to 500 mm. As such, the corner radius 108 may be less than 500 mm. It should be appreciated that value of the corner radius 108 may vary between the minimum radius and the maximum radius. Additionally, it should be appreciated that the values provided for the minimum radius and the maximum radius are example values, and that the minimum radius and the maximum radius may vary from the exemplary values provided herein.

In one implementation, the radially outer corner portion 100 extends from the radially inner end 102 outward away from the central axis 48 a radial distance 112 to the radial outer end 104. The radial distance 112 may include a value between, for example, twenty five millimeters (25 mm) and two hundred millimeters (200 mm). More particularly, the radial distance 112 may include a value between seventy five millimeters (75 mm) and one hundred twenty five millimeters (125 mm). In one particular example, the radial distance is approximately equal to hundred millimeters (100 mm). The radially outer corner portion 100 extends in a circumferential direction from the radially inner end 102 toward the trailing edge 88 a circumferential distance 114 to the radially outer end 104. The circumferential distance 114 may include a value between, for example, ten millimeters (10 mm) and fifty millimeters (50 mm). More particularly, the circumferential distance 114 may include a value between, for example, twenty millimeters (20 mm) and forty millimeters (40 mm). in one particular example, the circumferential distance is approximately equal to thirty millimeters (30 mm).

In one implementation, the center portion 98 of the leading edge 86 may be curved and define a center radius 110. If so configured, the corner radius 108 of the radially outer corner portion 100 is less than the center radius 110 of the center portion 98. As such, the radially outer corner portion 100 includes and/or defines corner rate of curvature and the center portion 98 includes a center rate of curvature. As used herein, the "rate of curvature" is defined as the rate of change of direction of a curve with respect to distance along the curve. The corner rate of curvature is greater than the center rate of curvature because the corner radius 108 of the radially outer corner portion 100 of the leading edge 86 is greater than the center radius 110 of the center portion 98 of the leading edge 86. In other implementations, it should be appreciated that the center portion 98 of the leading edge 86 may be straight and therefore not define a center radius 110.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An extractor for a sugarcane harvester, the extractor comprising:

a housing defining an interior passage extending along a central axis;

a fan assembly positioned within the interior passage of the housing, wherein the fan assembly includes a fan blade mounted for rotation about the central axis and configured for inducing a flow of air through the interior passage for extracting leaf material from a flow of sugarcane billets;

wherein the fan blade includes a leading edge and a trailing edge relative to a rotational direction of the fan assembly, with the leading edge including a bevel defining a cutting edge configured for cutting the leaf material;

wherein the fan blade extends radially outward from the central axis to a radially outer edge of the fan blade that extends between the leading edge and the trailing edge;

wherein the leading edge includes a center portion and a radially outer corner portion, with the radially outer corner portion of the leading edge extending between the center portion of the leading edge and the radially outer edge;

wherein the radially outer corner portion is curved toward the trailing edge; and wherein the radially outer corner portion includes a corner rate of curvature and the center portion includes a center rate of curvature, with the corner rate of curvature greater than the center rate of curvature.

2. The extractor set forth in claim 1, wherein the bevel defining the cutting edge extends across both the center portion and the radially outer corner portion.

3. The extractor set forth in claim 1, wherein the radially outer corner portion includes a radially inner end arranged tangential to the center portion.

4. The extractor set forth in claim 3, wherein the radially outer corner portion includes a radially outer end arranged such that the radially outer corner portion forms an obtuse angle with the radially outer edge.

5. The extractor set forth in claim 1, wherein the radially outer corner portion defines a corner radius greater than 150 mm.

6. The extractor set forth in claim 5, wherein the corner radius is less than 500 mm.

7. The extractor set forth in claim 5, wherein the center portion defines a center radius, with the corner radius of the radially outer corner portion less than the center radius of the center portion.

8. The extractor set forth in claim 1, wherein the fan blade includes a body extending between the leading edge and the trailing edge, and wherein the body is angled relative to a plane of rotation of the fan blade for inducing the flow of air through the interior passage of the housing.

9. A fan blade for an extractor of a sugarcane harvester, the fan blade comprising:

a body configured for rotation about an axis for inducing a flow of air parallel to the axis for separating leaf material from a flow of sugarcane billets;

wherein the body includes a leading edge and a trailing edge arranged relative to a rotational direction, with the leading edge including a bevel defining a cutting edge configured for cutting the leaf material;

wherein the body extends radially outward between a radially inner edge of the body and a radially outer edge of the body, and extends between the leading edge and the trailing edge along both the radially inner edge and the radially outer edge;

wherein the leading edge includes a center portion and a radially outer corner portion, with the radially outer corner portion of the leading edge extending between the center portion of the leading edge and the radially outer edge;

wherein the radially outer corner portion is curved toward the trailing edge; and wherein the radially outer corner portion includes a corner rate of curvature and the center portion includes a center rate of curvature, with the corner rate of curvature greater than the center rate of curvature.

10. The fan blade set forth in claim 9, wherein the bevel defining the cutting edge extends across both the center portion and the radially outer corner portion.

11. The fan blade set forth in claim 9, wherein the radially outer corner portion includes a radially inner end arranged tangential to the center portion.

12. The fan blade set forth in claim 11, wherein the radially outer corner portion includes a radially outer end arranged such that the radially outer corner portion forms an obtuse angle with the radially outer edge.

13. The fan blade set forth in claim 10, wherein the radially outer corner portion defines a corner radius greater than 150 mm.

14. The fan blade set forth in claim 13, wherein the corner radius is less than 500 mm.

15. The fan blade set forth in claim 13, wherein the center portion defines a center radius, with the corner radius of the radially outer corner portion less than the center radius of the center portion.

16. A sugarcane harvester comprising:

a basecutter having a cutting disk configured for severing stalks of sugarcane;

a chopper having a drum configured for cutting the stalks of sugarcane into billets;

an extractor configured for separating leaf material from the sugarcane billets, the extractor including:

a housing defining an interior passage extending along a central axis;

a fan assembly positioned within the interior passage of the housing, wherein the fan assembly includes a fan blade mounted for rotation about the central axis and configured for inducing a flow of air through the interior passage for extracting the leaf material from the sugarcane billets;

wherein the fan blade includes a body defining a leading edge and a trailing edge relative to a rotational direction of the fan assembly, with the leading edge including a bevel defining a cutting edge configured for cutting the leaf material;

wherein the body is angled relative to a plane of rotation of the fan blade for inducing the flow of air through the interior passage of the housing;

wherein the fan blade extends radially outward from the central axis to a radially outer edge of the fan blade, between the leading edge and the trailing edge;

wherein the leading edge includes a center portion and a radially outer corner portion, with the radially outer corner portion of the leading edge extending between the center portion of the leading edge and the radially outer edge;

wherein the radially outer corner portion is curved toward the trailing edge; and wherein the radially outer corner portion includes a corner rate of curvature and the center portion includes a center rate of curvature, with the corner rate of curvature greater than the center rate of curvature.

17. The sugarcane harvester set forth in claim 16, wherein the radially outer corner portion includes a radially inner end disposed adjacent the center portion, and includes a radially outer end arranged such that the radially outer corner portion forms an obtuse angle with the radially outer edge.

18. The sugarcane harvester set forth in claim 16, wherein the radially outer corner portion defines a corner radius greater than 150 mm.

* * * * *